United States Patent
Larsen

(10) Patent No.: US 6,419,305 B1
(45) Date of Patent: Jul. 16, 2002

(54) AUTOMOTIVE PILLAR REINFORCEMENT SYSTEM

(75) Inventor: Douglas C. Larsen, Highland, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/676,443

(22) Filed: Sep. 29, 2000

(51) Int. Cl.$^7$ ............................................... B60R 27/00
(52) U.S. Cl. ................. 296/203.03; 296/188; 52/731.6; 52/735.1
(58) Field of Search ................................. 296/187, 188, 296/189, 203.01, 203.03, 146.6; 52/731.6, 735.1

(56) References Cited

U.S. PATENT DOCUMENTS

| | | |
|---|---|---|
| 1,814,677 A | 7/1931 | Fennema |
| 3,649,375 A | 3/1972 | Venkatesan |
| 3,868,796 A | 3/1975 | Bush |
| 4,029,128 A | 6/1977 | Yamagishi |
| 4,083,384 A | 4/1978 | Horne et al. |
| 4,463,870 A | 8/1984 | Coburn, Jr. et al. |
| 4,695,343 A | 9/1987 | Wycech |
| 4,769,391 A | 9/1988 | Wycech |
| 4,813,690 A | 3/1989 | Coburn, Jr. |
| 4,901,395 A | 2/1990 | Semrau |
| 4,946,737 A | 8/1990 | Lindeman et al. |
| 4,984,406 A | 1/1991 | Friesen |
| 5,040,803 A | 8/1991 | Cieslik et al. |
| 5,072,952 A | 12/1991 | Irrgeher et al. |
| 5,358,397 A | 10/1994 | Ligon et al. |
| 5,382,397 A | 1/1995 | Turner, Jr. |
| 5,575,526 A * | 11/1996 | Wycech .................. 296/188 X |
| 5,577,784 A | 11/1996 | Nelson |
| 5,642,914 A * | 7/1997 | Takabatake ................. 296/187 |
| 5,755,486 A * | 5/1998 | Wycech ...................... 296/188 |
| 5,806,915 A * | 9/1998 | Takabatake ................. 296/187 |
| 5,819,408 A | 10/1998 | Catlin |
| 5,851,626 A | 12/1998 | McCorry et al. |
| 5,871,849 A | 2/1999 | Lepine |
| 5,878,784 A | 3/1999 | Sales et al. |
| 5,894,071 A | 4/1999 | Merz et al. |
| 5,901,752 A | 5/1999 | Lundman |
| 5,902,656 A | 5/1999 | Hwang |
| 5,992,923 A * | 11/1999 | Wycech ...................... 296/188 |
| 6,006,484 A | 12/1999 | Geissbuhler |
| 6,053,210 A | 1/2000 | Chapman et al. |
| 6,073,991 A | 1/2000 | Naert |
| 6,033,300 A | 3/2000 | Schneider |

(List continued on next page.)

FOREIGN PATENT DOCUMENTS

| | | |
|---|---|---|
| DE | 36 27 725 A1 | 2/1988 |
| DE | 4028895 C1 | 2/1992 |
| DE | 196 35 734 A | 4/1997 |
| DE | 196 44 047 A1 | 5/1998 |
| DE | 196 48 164 A | 5/1998 |

(List continued on next page.)

OTHER PUBLICATIONS

Copending application, Ser. No. 60/296,312, filed Jun. 6, 2001.
Translation of previously submitted French reference 2 749 263, publication date Dec. 5, 1997.
International Search Report dated Mar. 12, 2002.

Primary Examiner—Joseph D. Pape
Assistant Examiner—Lori L Coletta
(74) Attorney, Agent, or Firm—Dobrusin & Thennisch PC

(57) ABSTRACT

An automotive pillar reinforcement system having a skeleton member designed to be secured to a vehicle pillar, such as an automotive "B" pillar. An expandable material, such as an epoxy-based reinforcing material, is disposed on the skeleton member. In one application, the system is utilized to reinforce structural portions of an automotive vehicle, such as a "B" pillar found in a vehicle, wherein the material expands and cures during an automobile assembly operation, bonding the reinforcement system to the pillar structure and the vehicle panels.

16 Claims, 2 Drawing Sheets

U.S. PATENT DOCUMENTS

| | | | |
|---|---|---|---|
| 6,092,864 A * | 7/2000 | Wycech et al. ............. 296/204 |
| 6,099,948 A * | 8/2000 | Paver, Jr. ................ 428/304.4 |
| 6,131,897 A * | 10/2000 | Barz et al. .................. 269/207 |
| 6,146,565 A | 11/2000 | Keller |
| 6,174,932 B1 | 1/2001 | Pachl et al. |
| 6,189,953 B1 | 2/2001 | Wycech |
| 6,196,621 B1 | 3/2001 | VanAssche |
| 6,197,403 B1 | 3/2001 | Brown et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 * | 6/2001 | Takabatake ................ 52/731.6 |
| 6,253,524 B1 * | 7/2001 | Hopton et al. ............. 52/731.2 |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,277,898 B1 | 8/2001 | Pachl et al. |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |

FOREIGN PATENT DOCUMENTS

| | | |
|---|---|---|
| DE | 19812288 C1 | 5/1999 |
| DE | 197 53 658 A | 6/1999 |
| DE | 299 04 705 U | 6/1999 |
| DE | 19856255 C1 | 1/2000 |
| DE | 19858903 A1 | 6/2000 |
| EP | 0 679 501 A1 | 11/1995 |
| EP | 0 893 332 B1 | 3/2002 |
| FR | 2 539 693 A1 | 7/1984 |
| FR | 2749263 A1 | 5/1996 |
| JP | 61118211 | 6/1986 |
| JP | 01164867 | 6/1989 |
| JP | 2001191947 | 7/2001 |
| WO | WO 87 01978 A | 4/1987 |
| WO | WO 96/22324 | 5/1997 |
| WO | WO 98/36944 | 8/1998 |
| WO | WO 99/28575 | 6/1999 |
| WO | WO 99/48746 | 9/1999 |
| WO | WO 99/64287 * | 12/1999 |
| WO | WO 00/03894 | 1/2000 |
| WO | WO 00/17000 | 3/2000 |
| WO | WO 00/12595 | 4/2000 |
| WO | WO 00/27920 | 5/2000 |
| WO | WO 00/37302 | 6/2000 |
| WO | WO 00/55444 | 9/2000 |
| WO | WO 01/57130 | 2/2001 |
| WO | WO 01/54936 | 8/2001 |
| WO | WO 01/56845 | 8/2001 |
| WO | WO 01/71225 | 9/2001 |
| WO | WO 01/83206 | 11/2001 |

* cited by examiner

AUTOMOTIVE PILLAR REINFORCEMENT SYSTEM

FIELD OF THE INVENTION

The present invention relates generally to a reinforced structural member for use in strengthening the stiffness and strength of different portions of an automotive vehicle. More particularly, the present invention relates to a structural reinforcement system for use in an automotive pillar, especially an automotive "B" pillar, which serves to absorb energy in the vehicle body and pillar structure in the event of an front offset impact to the automotive vehicle through the use of a reinforced member coated over a portion of its surface with an expandable material, the combination of which may be employed to increase the structural stiffness and strength of the automotive vehicle.

BACKGROUND OF THE INVENTION

For many years the transportation industry has been concerned with designing reinforced structural members that do not add significantly to the weight of a vehicle. For example, U.S. Pat. Nos. 5,755,486; 4,901,500; and 4,751,249 describe prior art reinforcing devices. While these prior art devices may be advantageous in some circumstances, there is needed a simple low cost structure or system that permits coupling the reinforcement member to a variety of structures of varying geometric configurations. Further, changing developments in both consumer demand and automotive manufacturing processes are continually creating new and different types of vehicles and vehicle segments for the consumer market. Many of these new vehicle designs, such as crew/club cab trucks, car/truck hybrid vehicles, and cars having "third" doors for example present a number of unique applications and challenges to provide structural reinforcement systems that strengthen the desired section of an automotive vehicle, while still providing sound and vibration characteristics, all in a manner which can be streamlined into the automotive vehicle manufacturer's production process in a cost efficient manner.

In the automotive industry, there is also a need for a relatively low cost system for reinforcing automotive pillar structures in a vehicle, which can serve to absorb energy in a front offset impact to the vehicle, by reinforcing the pillar to redirect pillar travel in an impact.

SUMMARY OF THE INVENTION

The present invention is directed to a structural reinforcement system and, more particularly, one for reinforcing an automotive vehicle pillar, such as a "B" pillar, in an automotive vehicle, such as (without limitation) vehicle roof and pillar structures, door beams and door beam assemblies, frame assemblies, structural rails, rocker panels, and other door striker applications. Generally speaking, these automotive vehicle applications may utilize technology and processes such as those disclosed in U.S. Pat. Nos. 4,922,596, 4,978,562, 5,124,186, and 5,884,960 and commonly owned, co-pending U.S. application Ser. Nos. 09/502,686 filed Feb. 11, 2000 and Ser. No. 09/524,961 filed Mar. 14, 2000, all of which are expressly incorporated by reference. The system generally employs a skeleton member adapted for stiffening the structure to be reinforced and helping to redirect applied loads. In use, the skeleton member is in contact, over at least a portion of its outer surface, with an energy absorbing medium, and particularly heat activated bonding material. In a particular preferred embodiment, the member could be an injection molded nylon carrier, an injection molded polymer, or a molded metal (such as aluminum, magnesium, and titanium, an alloy derived from the metals, and even a metallic foam). Still further, the member adapted for stiffening the structure to be reinforced could comprise a stamped and formed cold-rolled steel, a stamped and formed high strength low alloy steel, a stamped and formed transformation induced plasticity (TRIP) steel, a roll formed cold rolled steel, a roll formed high strength low alloy steel, or a roll formed transformation induced plasticity (TRIP) steel. The chosen member is at least partially coated with a foamable or expandable material, which could comprise an epoxy-based resin, such as L5204, L5206, L5207, L5208 or L5209 structural foam commercially available from L & L Products of Romeo, Mich. Additional foamable or expandable materials that could be utilized in the present invention include other materials which are suitable as bonding mediums and which may be heat activated foams which activate and expand to fill a desired cavity or occupy a desired space or function when exposed to temperatures typically encountered in automotive e-coat and other paint operations. In addition, it is contemplated that the skeleton member could comprise a nylon or other polymeric material as set forth in commonly owned U.S. Pat. No. 6,103,341, expressly incorporated by reference herein.

Though other heat-activated materials are possible, a preferred heat activated material is an expandable or flowable polymeric formulation, and preferably one that is activate to foam, flow or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof Without limitation, other examples of preferred foam formulation that are commercially available include polymer-based material commercially available from L&L Products, inc. of Romeo, Mich., under the designations as L-2105, L-2100, L-7005 or L-2018, L-7101, L-7102, L-2411, L-2412, L-4141, etc. and may comprise either open or closed cell polymeric base material.

A number of other suitable materials are known in the art and may also be used for vibration reduction. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the vibration reducing foam is usually initially processed as a flowable thermoplastic material before curing. It will cross-link upon curing, which makes the material resistant of further flow or change of final shape. For example, in the present invention relating to an automotive pillar, the heat activated expandable material fills a gap between a body side outer panel and a reinforcement panel.

It is also contemplated that foamable or expandable material could be delivered and placed into contact with the skeleton member or vehicle component, such as an automotive pillar, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In one embodiment the skeleton member along with a suitable amount of bonding or load transfer medium is placed in a cavity defined within an automotive vehicle, such as a vehicle roof structure, pillar structure, door beam assembly, hatch system, or other area or substrate found in an automotive vehicle which could benefit from the structural reinforcement, vibrational reduction, and noise reduction characteristics found in the present invention. In particular, the present invention could be utilized in conjunction with a specific substrate used in many automotive door assembly applications, commonly known in the automotive industry as a door striker. Generally speaking, a door striker is incorporated within a body side of a vehicle and is used in an automotive pillar structure to facilitate the closure and latch of the door in rigid placement suitable for movement of the vehicle. It is contemplated that the bonding medium could be applied to a substrate in a variety of patterns, shapes, and thicknesses to accommodate the particular size, shape, and dimensions of the cavity corresponding to the chosen vehicle application. The bonding medium is activated to accomplish expansion of the resin in the space defined between the skeleton member and the wall structure or body side outer panel defining the cavity. The resulting structure includes the wall structure joined to the skeleton member with the aid of the structural foam.

DETAILED DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
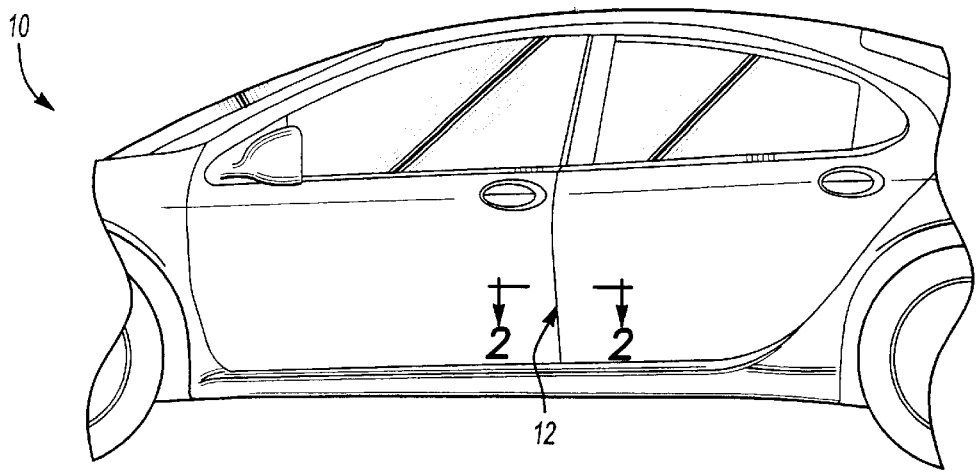
FIG. 1 is a view of a vehicle passenger compartment.

FIG. 1 illustrates an example of an automotive vehicle showing portions of a body structure 10 and, particularly, a door or pillar structure 12 located within the body structure 10. As will be appreciated, it is common for such structures to include a plurality of hollow vehicle body panel members 20 that are joined to define the body structure. One such structure, for purposes of illustration (without limitation) is a vehicle roof and pillar structure, but may also include door beams, door beam assemblies, frames, rails, door strikers, hinges, rocker panels, cargo doors, hatchbacks, tail gates, and other portions of automotive vehicles. As will be recognized, included in the roof and pillar structure may also be windows, sunroofs or other removable tops, vehicle doors and door components, headliners (with or without overhead accessories), or the like. As discussed later, other vehicle members or surfaces and delivery systems for the expandable material are also contemplated within the scope of the present invention.

Figure 2:
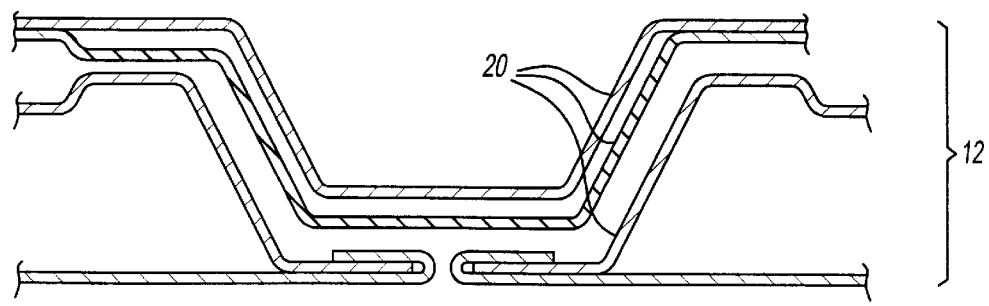
FIG. 2 is a sectional view of a traditional pillar structure without the pillar reinforcement system in accordance with the present invention.
Figure 3:
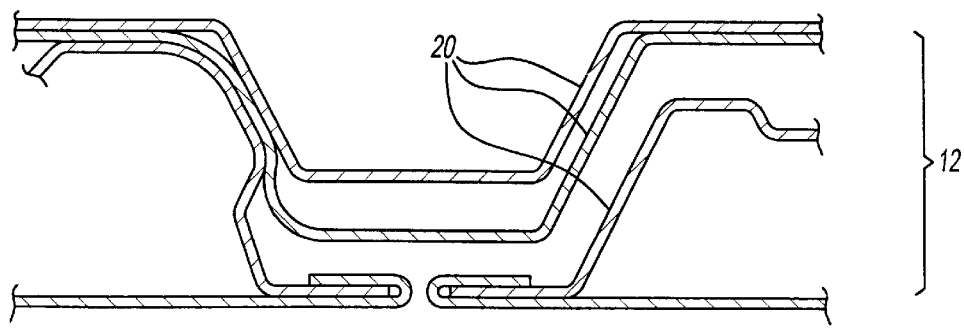
FIG. 3 is a sectional view of the traditional pillar structure of FIG. 2 after a front offset impact showing deformation and interference of the pillar structure.
Figure 4:
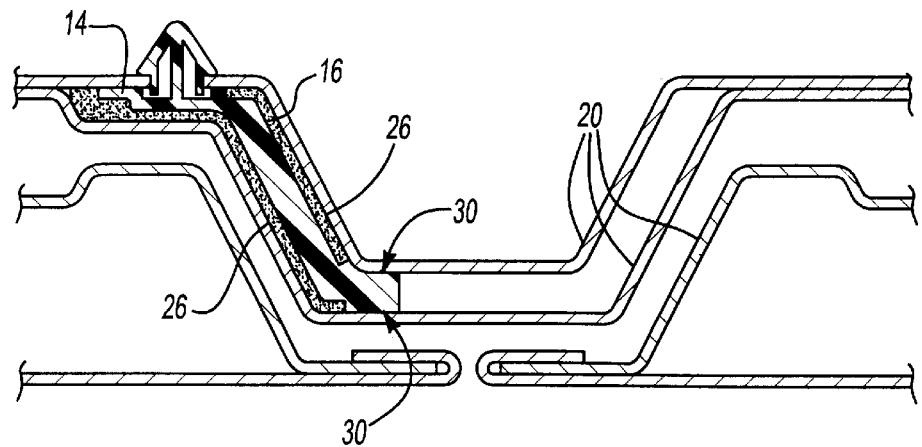
FIG. 4 is a sectional view of an automotive pillar showing a skeleton member with the attached expandable material after activation and expansion of the material.

FIG. 2 illustrates a pillar structure 12 without the pillar reinforcement system of the present invention. In some instances, the force of a front offset impact may displace the vehicle door rearward into the body structure 10 at a position commonly known as the vehicle "B" pillar. As shown in FIG. 3, deformation of the body structure at the "B" pillar might occur as a result of the front offset impact. In certain cases, this deformation of the structure potentially may result in an interference in the body structure 10. Accordingly, as shown in FIG. 4, the present invention provides a pillar reinforcement system consisting of a skeletal member or carrier 14 for placement into the cavity or gap defined in the pillar structure 12 wherein a high compressive strength heat activated expandable material 16 is placed and attached along and onto the member 14 by means of snap fit attachment means such as fasteners, arrowhead fasteners, and the like. The material 16 is generally dry to the touch and can be placed along the member 14 in any form of desired pattern, placement, or thickness depending upon the placement of the door striker or other desired area for reinforcement and defection of force from an outside impact. Once the material 16 is heat activated through operation of an e-coat process or other painting operation typically encountered in the production of automotive vehicles, the material expands and adheres to the body side outer panel thereby structurally adhering the material 16 and the desired area of reinforcement.

Figure 5:
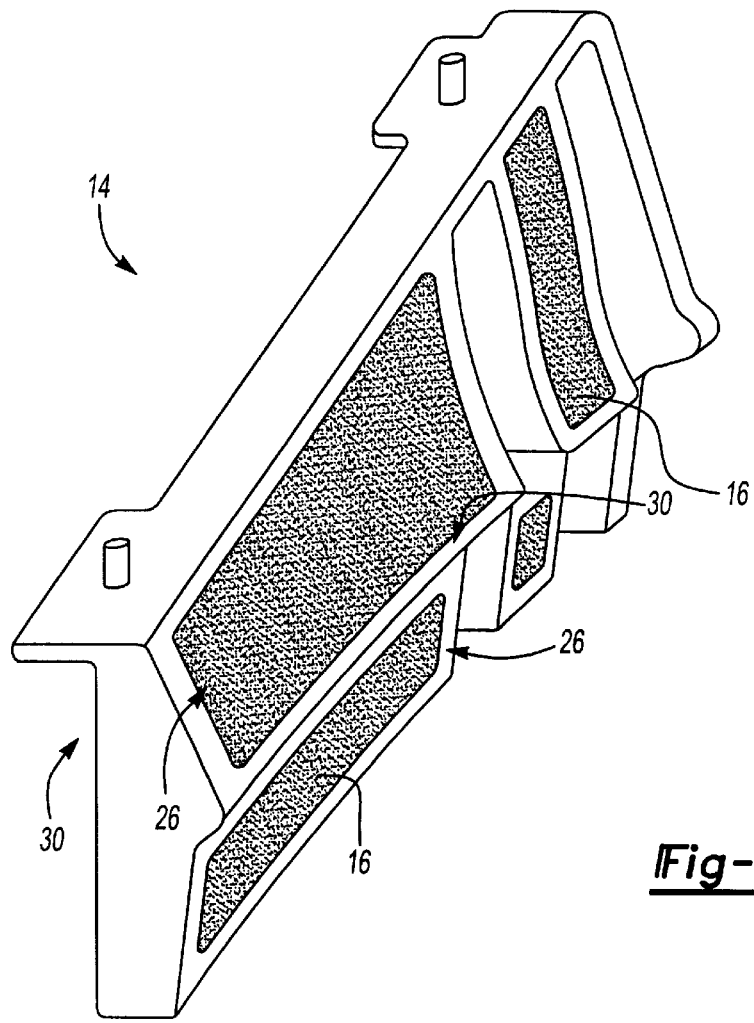
FIG. 5 is a perspective view of the automotive pillar reinforcement system in accordance with the present invention before the material has been expanded.

In a particular preferred embodiment relating to an automotive "B" pillar, the expansion of the material 16 effectively serves to absorb energy, potentially preventing interference of the pillar and reinforcement. FIG. 5 illustrates the pillar reinforcement system of the present invention wherein the member or carrier 14 is at least partially coated with an expandable material 16 attached to the carrier by means of indentations 26 and/or conventional fasteners. As shown, surfaces 30 of the carrier 14 are adapted for carrying the expandable material 16. In a preferred embodiment, the carrier 14 is comprised of a molded glass filled nylon, which, through arrowhead fasteners, secures the expandable material 16, such as L-5204 structural foam available through L&L Products, Inc. of Romeo, Mich.

This reinforcement of the pillar structure 12 is accomplished by locating one or more skeleton members or carriers 14 in accordance with the present invention in a hollow or cavity portion of the pillar structure 12 and the body side outer panel (not shown). FIG. 4 illustrates examples of this by showing a member 14 with material 16 affixed to it in such a location. The member 14 is preferably sealingly secured to at least one of the pillar sections by a bonding material, which upon heat activation produces adhesion to skeleton members to help secure the members and the walls defining the hollow from movement within the hollow portion.

Though other heat activated materials are possible, a preferred heat activated material is an expandable plastic, and preferably one that is foamable. A particularly preferred material is an epoxy-based structural foam. For example, without limitation, in one embodiment, the structural foam is an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208 and L5209. One advantage of the preferred structural foam materials 16 over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier or member 14 through fastening means which are well known in the art.

While the preferred materials for fabricating the structural foam have been disclosed, the structural foam can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. patent application Ser. No. 09/268,810, the teachings of which are incorporated herein by reference, filed with the U.S. Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the structural foam 16 may be increased to as high as 1500 percent or more. Typically, strength is obtained from products that possess low expansion.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755, 486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the material 16 is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure 12 or door beam, and applying it thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

A number of advantages are realized in accordance with the present invention, including, but not limited to, the ability to manufacture an integrated pillar structure ready for delivery and assembly at a vehicle assembly plant without the need for application of pumpable products, wet chemical products, and multiple sets of tools, such as for other prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A reinforced pillar system for an automotive vehicle, comprising:
    (a) an automotive pillar structure of an automotive vehicle, said structure having a plurality of panel members defining a cavity therein;
    (b) a carrier member disposed within said cavity, the carrier member including a first surface opposing and substantially parallel to a second surface, the first surface configured to oppose a first of the plurality of panel members and the second surface configured to oppose a second of the plurality of panel members, the first surface and the second surface each including at least one indentation defined therein, the first and second surface separated by a thickness of the carrier member;
    (c) an expandable structural material in sealing contact with the first surface and the second surface of said carrier member and in sealing contact with the first of the plurality of panel members and the second of the plurality of panel members; and
    wherein said carrier member is configured to extend substantially further in directions parallel to the panel members than the carrier member extends in directions perpendicular to the panel members.

2. The system as claimed in claim 1, wherein said expandable material is a polymer material.

3. The system as claimed in claim 1, wherein said expandable material is an epoxybased polymer material.

4. The system as claimed in claim 1, wherein said expandable material is a heat activated expandable polymer material.

5. The system as claimed in claim 1, wherein said expandable material is an expandable polymer material that is generally free of tack to touch.

6. The system as claimed in claim 1, wherein said expandable material is an expandable plastic material that can be activated at a temperature encountered in an automotive vehicle paint operation.

7. The system as claimed in claim 1, wherein said pillar structure is an automotive "B" pillar.

8. The system as claimed in claim 1, wherein said pillar structure further comprises a door striker.

9. A reinforced pillar system for an automotive vehicle, comprising:
    (a) an automotive pillar structure of an automotive vehicle selected from the group consisting of an A-pillar, a B-pillar and a C-pillar, said structure having a plurality of panel members defining a cavity therein;
    (b) a carrier member disposed within said cavity, the carrier member including a first surface opposing and substantially parallel to a second surface, the first surface configured to oppose a first of the plurality of panel members and the second surface configured to oppose a second of the plurality of panel members, the first surface and the second surface each including at least one indentation defined therein, the first and second surface separated by a thickness of the carrier member; and
    (c) an expandable structural material in sealing contact with the first surface and the second surface of said carrier member and in sealing contact with the first of the plurality of panel members and the second of the plurality of panel members;
    wherein said carrier member is configured to extend substantially further in directions parallel to the panel members than the carrier member extends in directions perpendicular to the panel members.

10. The system as claimed in claim 9, wherein said expandable material is a polymer material.

11. The system as claimed in claim 9, wherein said expandable material is an epoxy-based polymer material.

12. The system as claimed in claim 9, wherein said expandable material is a heat activated expandable polymer material.

13. The system as claimed in claim 9, wherein said expandable material is an expandable polymer material that is generally free of tack to touch.

14. The system as claimed in claim 9, wherein said expandable material is an expandable plastic material that can be activated at a temperature encountered in an automotive vehicle paint operation.

15. The system as claimed in claim 9, wherein said pillar structure is an automotive "B" pillar.

16. The system as claimed in claim 9, wherein said pillar structure further comprises a door striker.

* * * * *